United States Patent [19]
Tyson et al.

[11] Patent Number: 6,092,439
[45] Date of Patent: Jul. 25, 2000

[54] POSITIVE ACTING DIFFERENTIAL HAVING CHAMFERED TEETH

[75] Inventors: Mark V. Tyson, Balboa Island; Valentine Cucu, Long Beach; Peter A. Dickey, Costa Mesa, all of Calif.

[73] Assignee: Vehicular Technologies, Inc., Costa Mesa, Calif.

[21] Appl. No.: 09/311,867

[22] Filed: May 14, 1999

[51] Int. Cl.[7] ............................................. F16H 48/14
[52] U.S. Cl. ............................................................ 74/650
[58] Field of Search ................................................ 74/650

[56] References Cited

U.S. PATENT DOCUMENTS

| | | |
|---|---|---|
| 1,529,804 | 3/1925 | Nogrady . |
| 2,545,601 | 3/1951 | Brubaker . |
| 2,638,794 | 5/1953 | Knoblock . |
| 2,667,087 | 1/1954 | Myers . |
| 2,667,088 | 1/1954 | Myers . |
| 2,830,466 | 4/1958 | Myers . |
| 2,855,806 | 10/1958 | Fallon . |
| 3,131,578 | 5/1964 | Elliott . |
| 3,397,593 | 8/1968 | Knoblock . |
| 3,791,238 | 2/1974 | Bokovoy . |
| 4,104,931 | 8/1978 | Tomich . |
| 4,159,656 | 7/1979 | Tomich . |
| 4,424,725 | 1/1984 | Bawks . |
| 4,524,640 | 6/1985 | Neumann . |
| 4,557,158 | 12/1985 | Dissett . |
| 4,621,540 | 11/1986 | Davison . |
| 4,745,818 | 5/1988 | Edwards . |
| 5,413,015 | 5/1995 | Zentmyer . |
| 5,590,572 | 1/1997 | Valente . |
| 5,603,246 | 2/1997 | Zentmyer . |
| 5,637,049 | 6/1997 | Zentmyer . |
| 5,836,220 | 11/1998 | Valente . |

*Primary Examiner*—Dirk Wright
*Attorney, Agent, or Firm*—Blakely, Sokoloff, Taylor & Zafman LLP

[57] ABSTRACT

Positive acting differentials of the type having drivers driven in rotation by a pinion pin and couplers coupled to the axles of a vehicle, the drivers and couplers having facingly disposed teeth forced into engagement when the pinion pin is driving the respective driver or drivers by forcibly contacting the same at an angle. The teeth on the drivers or couplers or both in the present invention have a chamfer on the outer part of the teeth in comparison to the base region of the teeth, so that the facingly disposed teeth on the drivers and couplers are forced into engagement when the base regions of the teeth are engaging and the pinion pin is driving the respective driver or drivers by forcibly contacting the same at an angle, but the teeth on the drivers and couplers will only climb each other when the outer regions of the teeth are engaging and the pinion pin is driving the respective driver or drivers. A preferred and an alternate embodiment are disclosed.

27 Claims, 13 Drawing Sheets

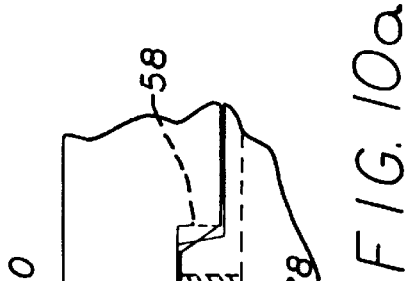
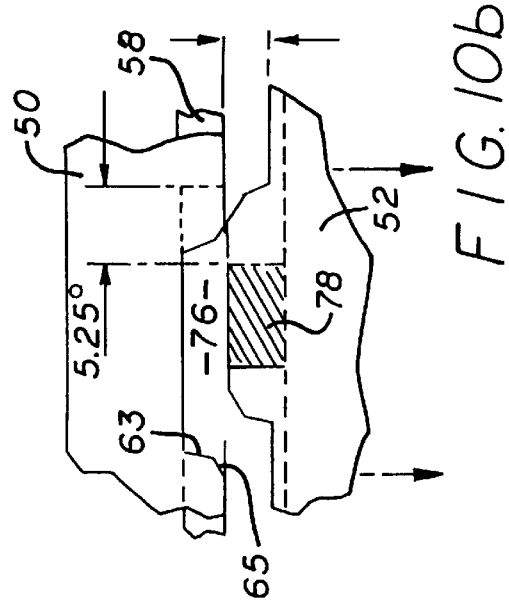
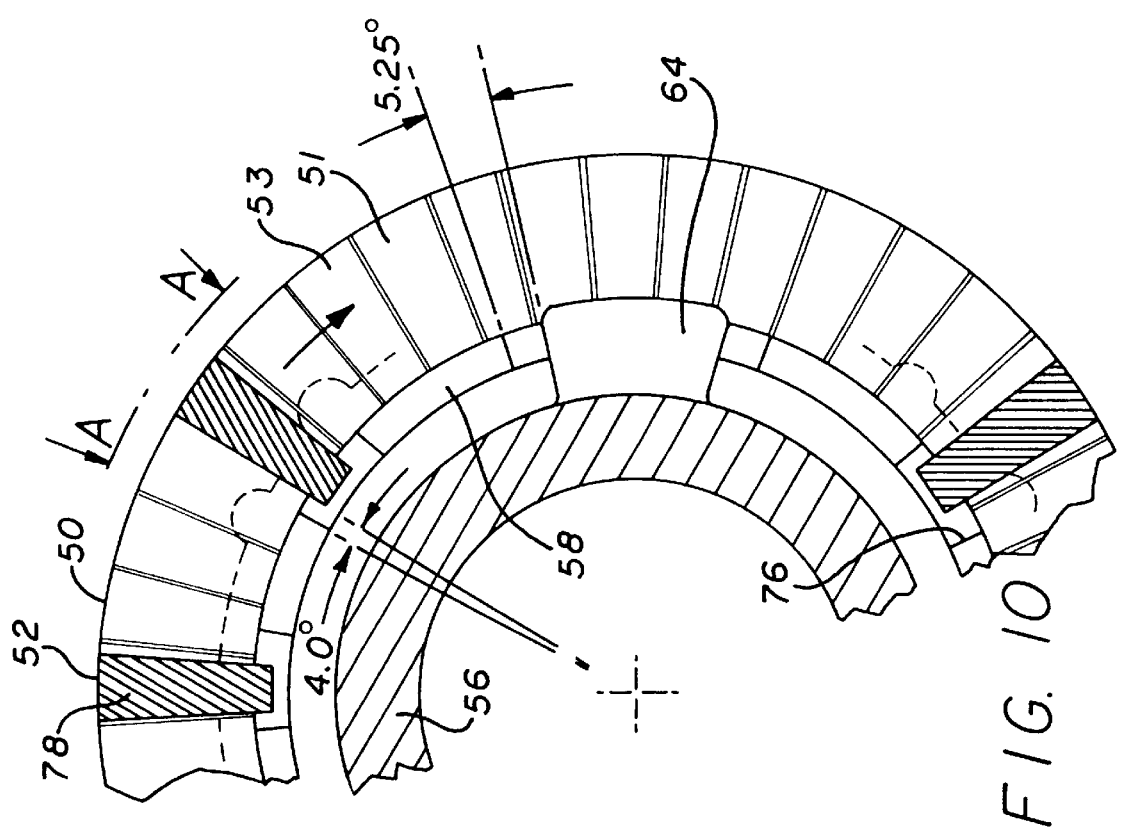

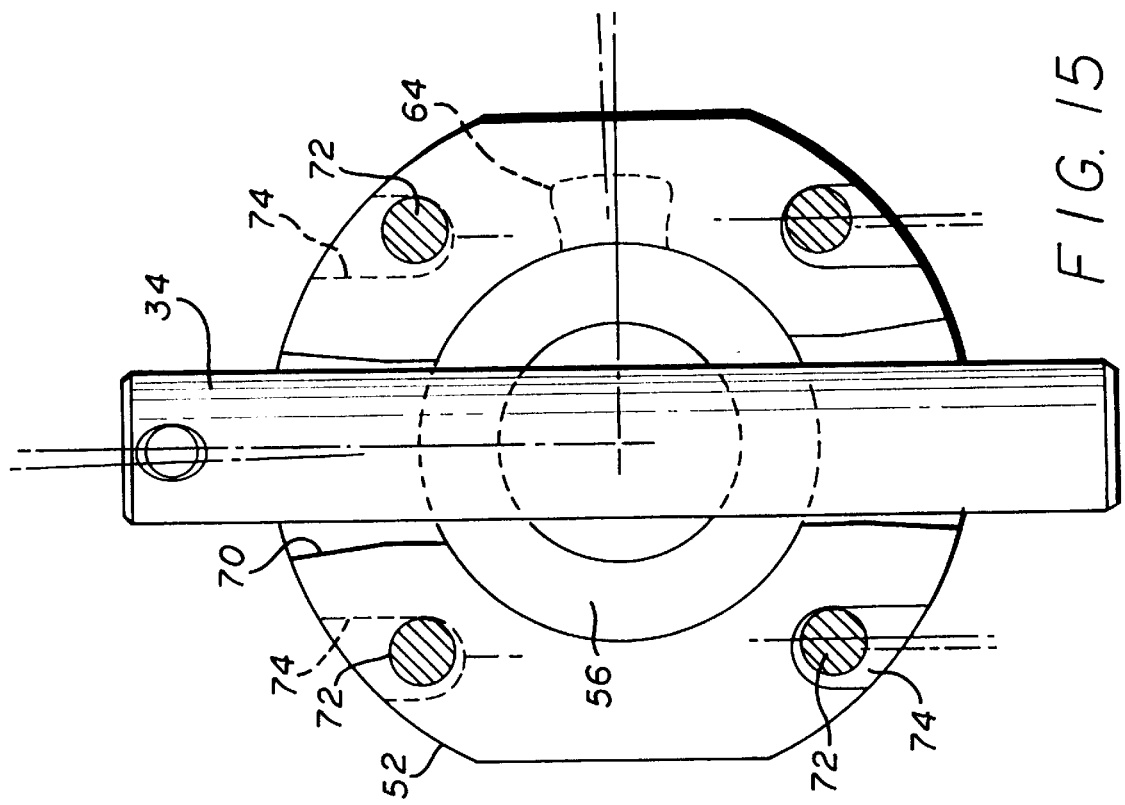
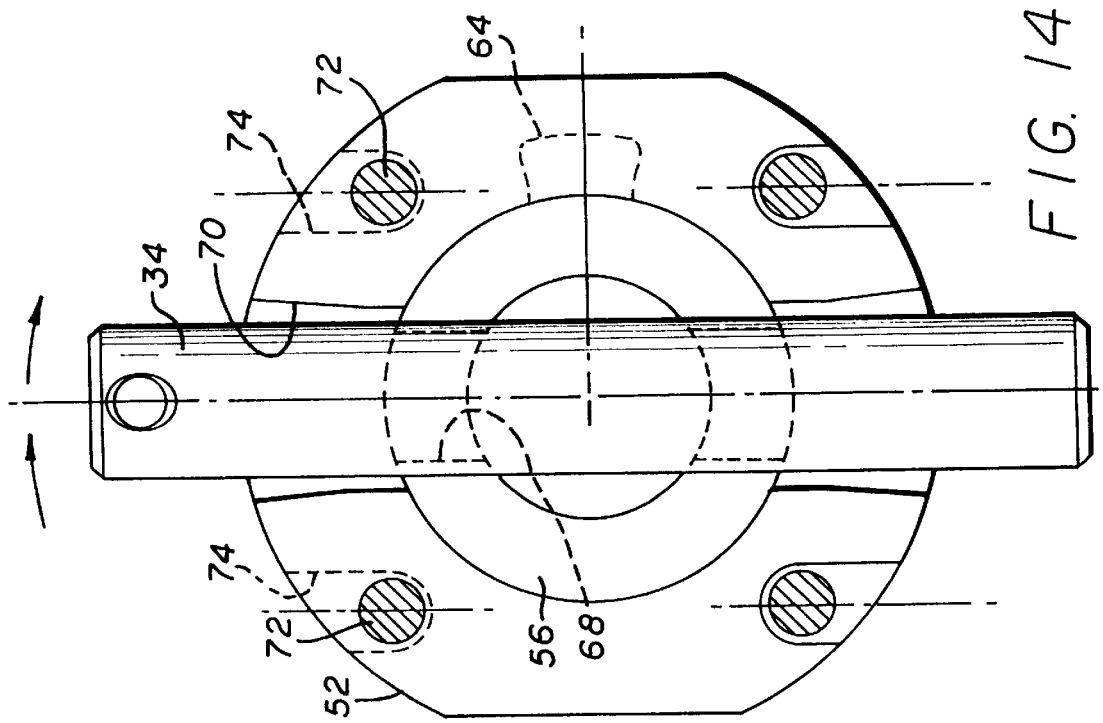

POSITIVE ACTING DIFFERENTIAL HAVING CHAMFERED TEETH

BACKGROUND OF THE INVENTION

1. Field of the Invention

The present invention relates to the field of positively acting differentials for motor vehicles.

2. Prior Art

Land vehicles, such as automobiles, trucks, buses and the like, typically utilize what has become known as an "open differential" for the final drive system. In such a differential, bevel gears are coupled to the inner ends of left and right collinear axles. These bevel gears engage accompanying bevel gears mounted on a pinion pin in a differential case. The differential case, in turn, has a ring gear thereon, with the ring gear and differential case being driven in rotation about the axis of the axles by a pinion gear on the drive shaft. The angular velocity of the ring gear and differential case determines the average angular velocity of the two axles. However, the bevel gearset within the differential case between the two axles allows one axle to turn faster and the other axle to turn slower than the ring gear and differential case at any particular time. This, of course, is highly desirable in normal driving, as it allows the axle coupled to the outer wheel to rotate faster than the axle coupled to the inner wheel when going around a curve or turning a sharp corner. It also causes the drive system to deliver the same drive torque to each of the two axles to avoid a tendency for the vehicle to pull to one side or the other when power is applied or removed. The amount of torque that can be transmitted through an open differential is limited to that able to be carried by the wheel with the least amount of traction.

There are certain situations, however, where the aforementioned characteristics of an open differential become undesirable. In particular, when one wheel loses traction, the torque which will be delivered to the wheel with traction will be no higher than the torque delivered to the wheel without traction. For instance, with one drive wheel on ice and the other drive wheel on dry concrete, the torque delivered to the drive wheel on dry concrete will be no higher than can be carried by the wheel on ice. A locking differential, however, will effectively couple the two axles together so that they turn in unison, forcing rotation of the drive wheel with greater traction along with the rotation of the wheel with lesser traction. The locking differential, as opposed to the open differential, can transmit as much torque as can be carried by the wheel with the most traction. High performance vehicles, off-road vehicles and the like may similarly take advantage of the characteristics of locking differentials to improve their traction performance.

The present invention is a significant improvement in a prior art differential manufactured by Vehicular Technologies, Inc., assignee of the present invention, and sold under the trademark "Performance". That prior art device is shown in the exploded view of FIG. 1. While FIG. 2 is a view of the assembled differential of the present invention, the improvements of the present invention are mostly internal to the assembly of FIG. 2, and accordingly, FIG. 2 is suggestive of the next higher assembly of the parts of FIG. 1. Referring to FIG. 1, the splined inner end of axle 20 engages mating splines in a coupler 22, with a similar coupler 22 at the opposite side of the assembly similarly mating at the inner end of the other axle, not shown. The axle bears against a pinion pin 34 that provides the inward limit for the axial position of the axle. In some embodiments (not shown), shims or thrust washers are used between the pin 34 and the ends of the axles 20 to establish the desired inward limit. A locking differential reuses some components of the open differential supplied with the vehicle. In particular, the pinion pin 34 that carries the bevel gears of the open differential may be reused although the bevel gears are not used. For this reason, pin 34 is referred to as a pinion pin even though it does not carry gears in a locking differential of the type shown. In the specific version shown, the axles are retained in position by C clips 24, though in other versions, axle retention may be by way of bearings adjacent to wheel ends of the axles and other means.

The couplers 22 have a plurality of teeth 26 on the face thereof which may mate with corresponding teeth on the faces 28 of drivers 30, depending upon the axial position of the drivers. The drivers 30, in turn, have saddle-shaped depressions 32 on the opposite faces thereof for loosely surrounding the pinion pin 34 driven by the differential case 54 (see FIG. 2 for the position of the pinion pin in the overall differential assembly). The drivers 30 each have springs 36 in angled blind holes in the driver, the springs acting on pin 34 to both elastically encourage the drivers to a position having the pin 34 aligned with the center of the saddle-shaped depressions, and to elastically encourage the drivers axially outward away from the pin 34 into engagement with the couplers. Spacers 38, together with any shims or thrust washers that may be required (not shown), establish and retain the couplers 22 at the desired separation from pin 34. Finally, pins 40 on the drivers 30 fit within slots 42 on the opposing face of the opposite driver and function to control the angular displacement of the drivers to each other.

In the final assembly, the springs 36 encourage the toothed face of the drivers 30 into engagement with the toothed face of couplers 22, and there is sufficient clearance between the saddle-shaped depressions 32 and pin 34 in the final assembly for either driver to move toward the pin 34 sufficiently to allow the teeth of a driver 30 to ride over the teeth of the associated coupler 22.

The operation of the prior art device may be explained as follows. With the teeth of the corresponding driver and coupler pairs engaged, the differential housing may rotate, carrying pin 34 from contact with one side of the saddle to the other, a displacement of (depending on the size of the design) 4 to 7 degrees. This free travel, or backlash, is essential for correct positioning of the differential components during the transition from driving to coasting and vice versa. The drivers are retained with respect to each other by pins 40 and mating slots 42 for a total rotation, one relative to the other, approximately one half of the backlash described previously. When the pin 34 engages the saddle-shaped depressions 32 on either driver, the force of the contact, by design of the saddles, will be angled outward from the plane of the respective driver and will overcome the component of the reaction force acting opposite created by the inclined edges on the mating teeth on the drivers 30 and couplers 22. For example, saddle angles ranging from 30 to 40 degrees are typically used and create outward axial forces that exceed the inward axial forces created by typical 20 to 25 degree inclines of the coupler and driver mating teeth that would otherwise work to separate the driver from the coupler. Using the foregoing parameters, consider first the vehicle at rest. Assume the two drivers 30 each engage with the respective coupler 22, and for specificity in the starting condition, that the pin 34 is centered in the saddle-shaped depressions 32 in the drivers 30. With the vehicle in gear and engine driving, the pin 34 begins to rotate about the axis of the axle, through the backlash present and compressing against springs 36 to contact the edges of the saddle-shaped depressions 32 in the drivers, and then on further rotation, to force the drivers and couplers, and thus the axles, into rotation. Because the contact angle between the pin 34 and the saddle-shaped depressions 32 exceeds the angle of the edge of the teeth on the couplers and drivers, the force between the pin and the drivers forcing the same into contact against the couplers 22 will exceed the force between the inclined edges of the teeth on the drivers 30 and couplers 22 otherwise tending to force the drivers back toward pin 34, so that the drivers and couplers will remain in positive engagement, regardless of the torque applied to the differential.

If the vehicle now proceeds to drive around a curve, the wheel on the outside of the curve, and thus the coupler 22 associated with that wheel, will tend to rotate faster than the coupler associated with the inside wheel. Assuming power is still being applied, this causes the driver associated with the outside wheel to begin "gaining" with respect to pinion pin 34, the driver rotating forward to a position wherein the saddle-shaped depressions 32 thereon are no longer in contact with pin 34. At this point, pins 40 and mating slots 42 prevent the further relative rotation of the two drivers but allow coaxial translation. Further gaining of the outside wheel continues to rotate the outside coupler at a speed higher than the other differential components. Now, however, the teeth on the driver associated with the outside wheel are free to climb the inclined planes of the teeth on the driver and coupler, with the driver moving toward the pin 34 against the resistance of the associated springs 36 to allow the teeth of the respective driver to slide over the teeth of the respective coupler, repeatedly as required so long as the difference in wheel rotation speeds exist.

If, when in a curve, the vehicle engine is throttled back to coast and the engine is used as a braking or vehicle slowing device, the same basic interaction of parts described above will occur substantially in reverse, now however with the driver and coupler associated with the outer wheel of the curve being engaged, and the driver associated with the inner wheel of the curve climbing over the teeth on the associated coupler as required to allow the inner wheel on the curve to turn slower than the outer wheel. Similarly, in backing around a curve such as backing out of a parking place, the inner wheel will be the drive wheel, as in powering forward, whereas use of the engine to retard the motion of the vehicle when backing will engage the wheel on the outer side of the turn. However in any event, when power is applied while turning to the point that traction is lost by the drive (inside) wheel, pin 34 will catch up to and forcibly engage the appropriate side of the saddle-shaped depression 32 on the outside wheel driver 30, forcing both drivers into engagement with their associated couplers to force rotation of both axles in unison.

The foregoing locking differential and another manufactured by Vehicular Technologies called "Lock Right" perform well, allowing the drive wheels to rotate independently under normal conditions, but causing the wheels to rotate in unison when either wheel loses traction and begins to slip. The Lock Right design differs from the aforementioned design in that it has no springs located in the saddle to dampen the backlash, rather springs are located between the drivers and thus work directly to force the driver teeth into mesh with those on the adjacent coupler. However, these differential designs contain a few particular operating characteristics that may require the vehicle operator to become accustomed to.

In particular, when one wheel begins turning faster than the other, such as when turning into a parking space, one driver will be climbing the teeth on the associated coupler and sliding thereover. When the teeth of the driver again align with the spaces between teeth on the coupler, the driver will fall into engagement with the coupler and shortly thereafter climb the sides of the teeth and again disengage. This makes an audible noise, resulting in a "click, click, click" type sound heard from outside the vehicle. In louder vehicles, such as a high performance vehicle, particularly for one technically versed to understand the source of the sound, the sound is of little consequence. However, to the driver of a more typical, quieter car, the sound can be a distraction, and could be misinterpreted as a mechanical fault or impending mechanical failure. Secondly, a phenomenon called "cycling" can be induced in manual transmission equipped vehicles. Automatic transmissions do not exhibit the condition because the torque converter always maintains a measure of bias load between the engine and drive axle. With manual transmissions, this event occurs when turning at slow speeds with the clutch pedal depressed, such as when turning into a parking space, temporarily decoupling the transmission from the engine and therefore removing any bias load present on the engaged driver and coupler. When the disengaged driver and coupler teeth pass by each other, they briefly reengage, enabling a load to be placed on the differential and axle components. The components between the differential and the wheel then act like an undamped mechanical spring and release the energy by temporarily accelerating the differential, drive shaft and transmission components. The inertia of these components carries the differential pin against the driver saddle, causing the opposite side driver and coupler to lock and continue to process. The continual wind-up and release will build and eventually become sufficient to "rock" the vehicle driveline and require the transmission be put in neutral or the vehicle stopped in order to cease the cycling. Needless to say, this is highly undesirable and would only be acceptable to the very most forgiving of owners. However all drivers whose vehicles represent a standard "as-delivered" condition would appreciate the increased traction a locking differential provides in situations where dry pavement type traction is not available. It would therefore be desirable to provide a differential with substantially the same simplicity as the differentials just described, but which is quiet and smooth in its operation, so as to neither be heard by nor concern the average driver of a vehicle equipped with the locking differential.

Another prior art differential is the Detroit Locker manufactured by Tractech, a Titan Wheel Company. In this "locking" type of differential, a cammed spider ring member takes the place of the differential pin and contains negative angle teeth that transfer torque to negative angle teeth on a driven clutch member which is able to slide axially on the splined barrel of the adjacent side gear. A single coil spring holds each driven cam against the spider. The side gear interfaces with the axle through another splined connection. While the driven clutch members separate from the central spider during turns, it is noteworthy to mention that a cam centrally located within the spider forces the driven clutch of the non-driving wheel away from the spider to a point of sufficient separation so that the separation device coupled to the driven clutch can be positioned to maintain the teeth of the driven clutch with slight engagement with the teeth of the spider until relative rotation between the driven clutch and spider again reverses direction. Because the teeth of the driven clutch slightly engage the teeth of the spider before passing over respective corner radii, there is slight sound when turning into a parking place.

While the Detroit Locker mechanism is functional, it is somewhat complex and in general cannot be assembled into pre-existing single piece differential cases because of access limitations. Accordingly, for the vast majority of vehicles, the original equipment differential case must be removed and a new differential case inserted with the locker assembly therein. This has the disadvantages of the extra cost of the new differential case, as well as requiring relocating the ring gear from the previous differential case to the Detroit Locker differential case, and again setting up the ring gear and drive shaft pinion gear for proper backlash and alignment for proper operation. In contrast, the positive acting differential developed by Vehicular Technologies herein described can be assembled into original equipment differential cases most often without removal of the differential from the vehicle, avoiding the expense of a new differential case and the time and skill required to again set up the spacing between the ring and pinion gearset.

BRIEF SUMMARY OF THE INVENTION

The present invention provides positive acting differentials of the type having drivers driven in rotation by a pinion pin and couplers coupled to the axles of a vehicle. The drivers and couplers have facingly disposed teeth forced into engagement when the pinion pin is driving the respective driver or drivers by forcibly contacting the same at an angle. The teeth on the drivers or couplers or both in the present invention have a chamfer on the outer part of the teeth in comparison to the base region of the teeth, so that the facingly disposed teeth on the drivers and couplers are forced into engagement when the base regions of the teeth are engaging and the pinion pin is driving the respective driver or drivers by forcibly contacting the same at an angle, but the teeth on the drivers and couplers will only climb each other when the outer regions of the teeth are engaging and the pinion pin is driving the respective driver or drivers. The chamfers assure that the drivers and couplers do not drivingly engage by only their thinner outer or tip regions. The chamfers also facilitate better operation in a particular quiet positive acting differential by assuring teeth climbing when the drivers and couplers only slightly engage.

BRIEF DESCRIPTION OF THE DRAWINGS

FIG. 10 is a view similar to FIG. 9, illustrating the relative part positions as the coupler being illustrated continues to rotate faster than the coupler for the wheel still being driven and the teeth on the driver 52 begin to climb the teeth on the coupler 50.

FIGS. 10a and 10b illustrate the extended teeth 78 and the driver 52 relative to the slot in the synchro ring 58 before the climbing of the teeth on the coupler 50 begins, and again just after climbing has been completed.

FIG. 14 illustrates the position of the pins 72 in slots 74 when the drivers are in alignment. It also shows the saddle-shaped depressions 70 of the two drivers centered FIG. 15 illustrates the position of the pins 72 in slots 74 when one driver is advanced relative to the other driver and remains with pin 34 engaged with the side of the saddle-shaped depression of one driver.

DETAILED DESCRIPTION OF THE INVENTION

Figure 1:
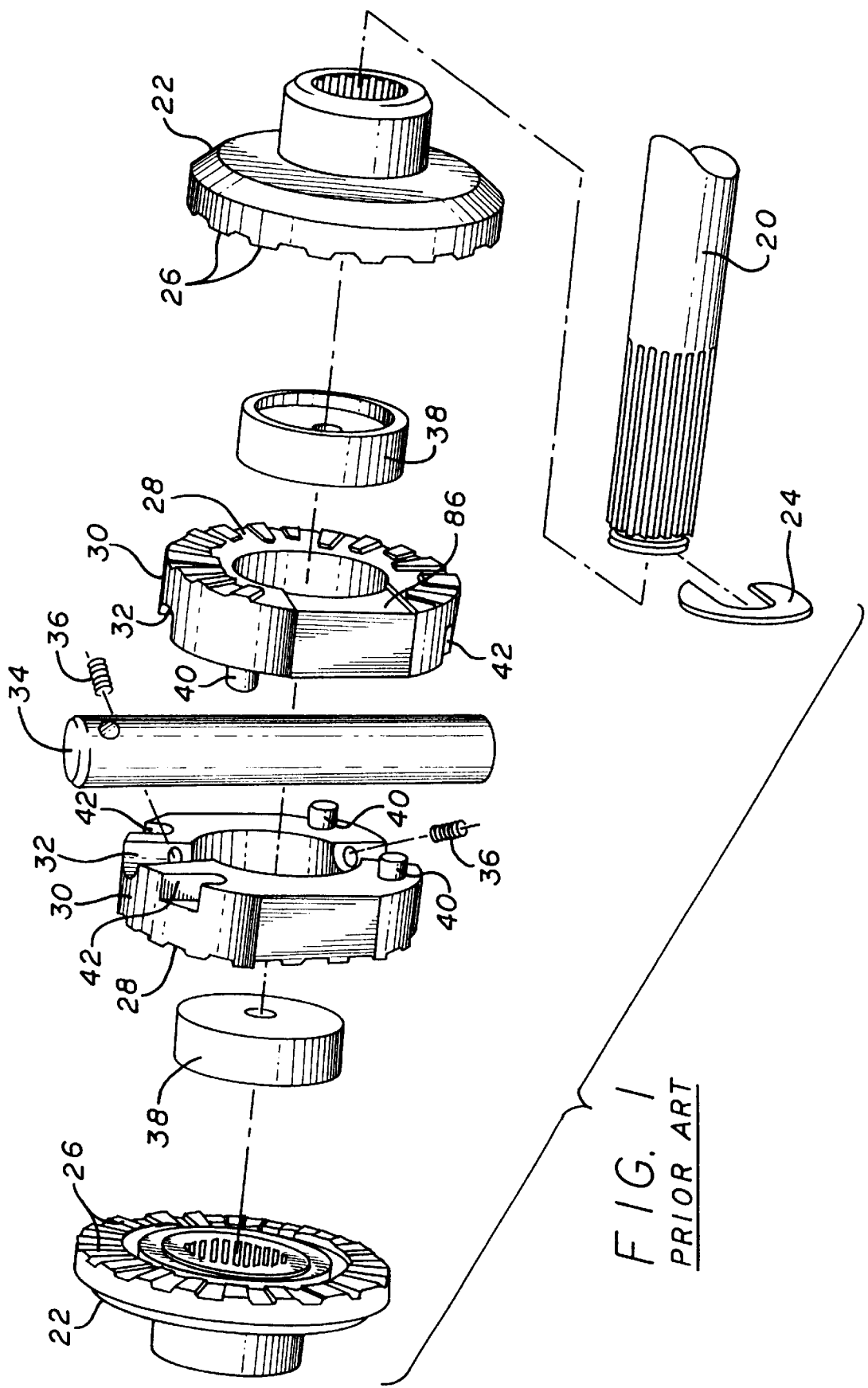
FIG. 1 is an exploded perspective view of a prior art locking differential.
Figure 2:
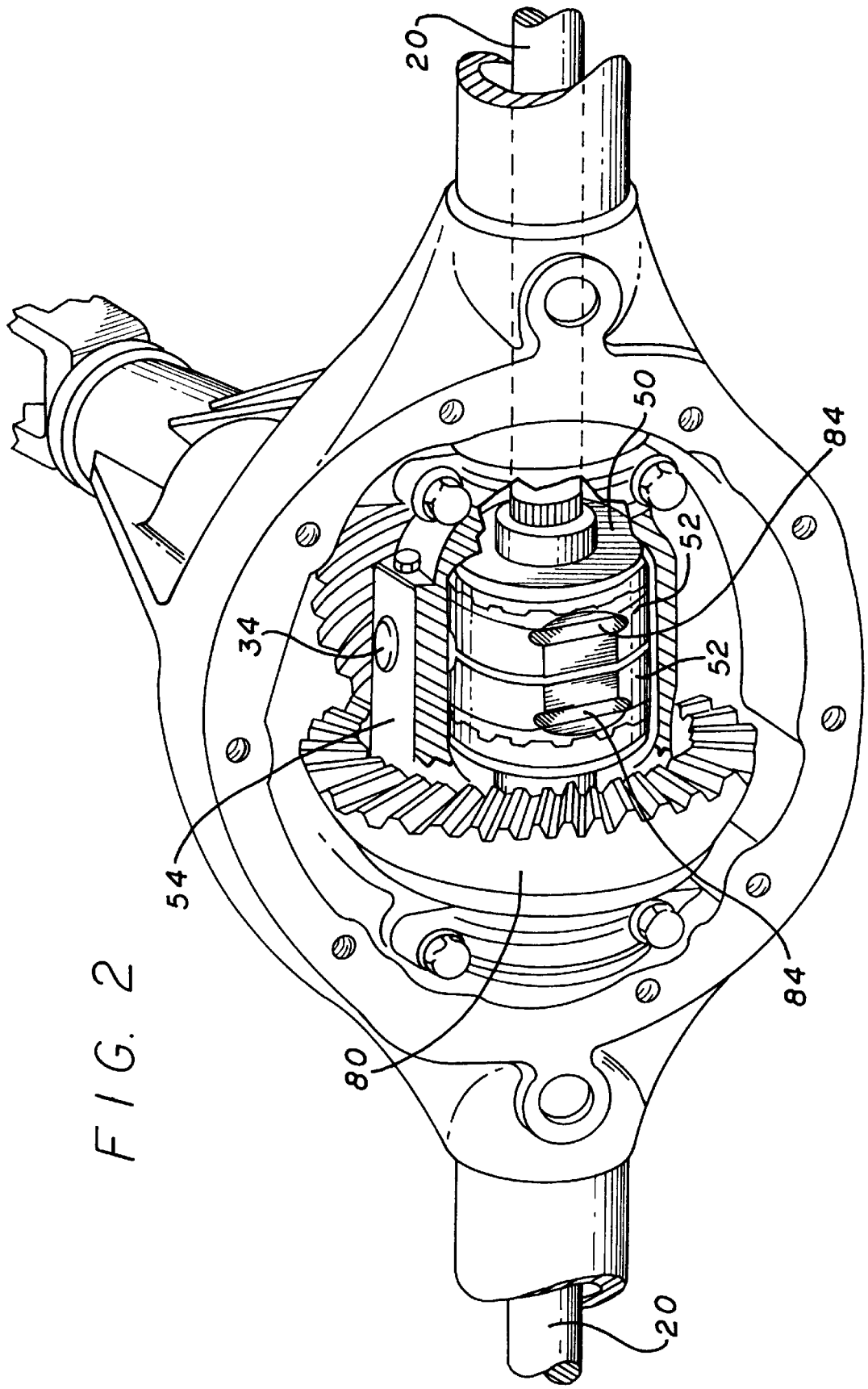
FIG. 2 is a rear view, cover off, of a differential incorporating the present invention.
Figure 3:
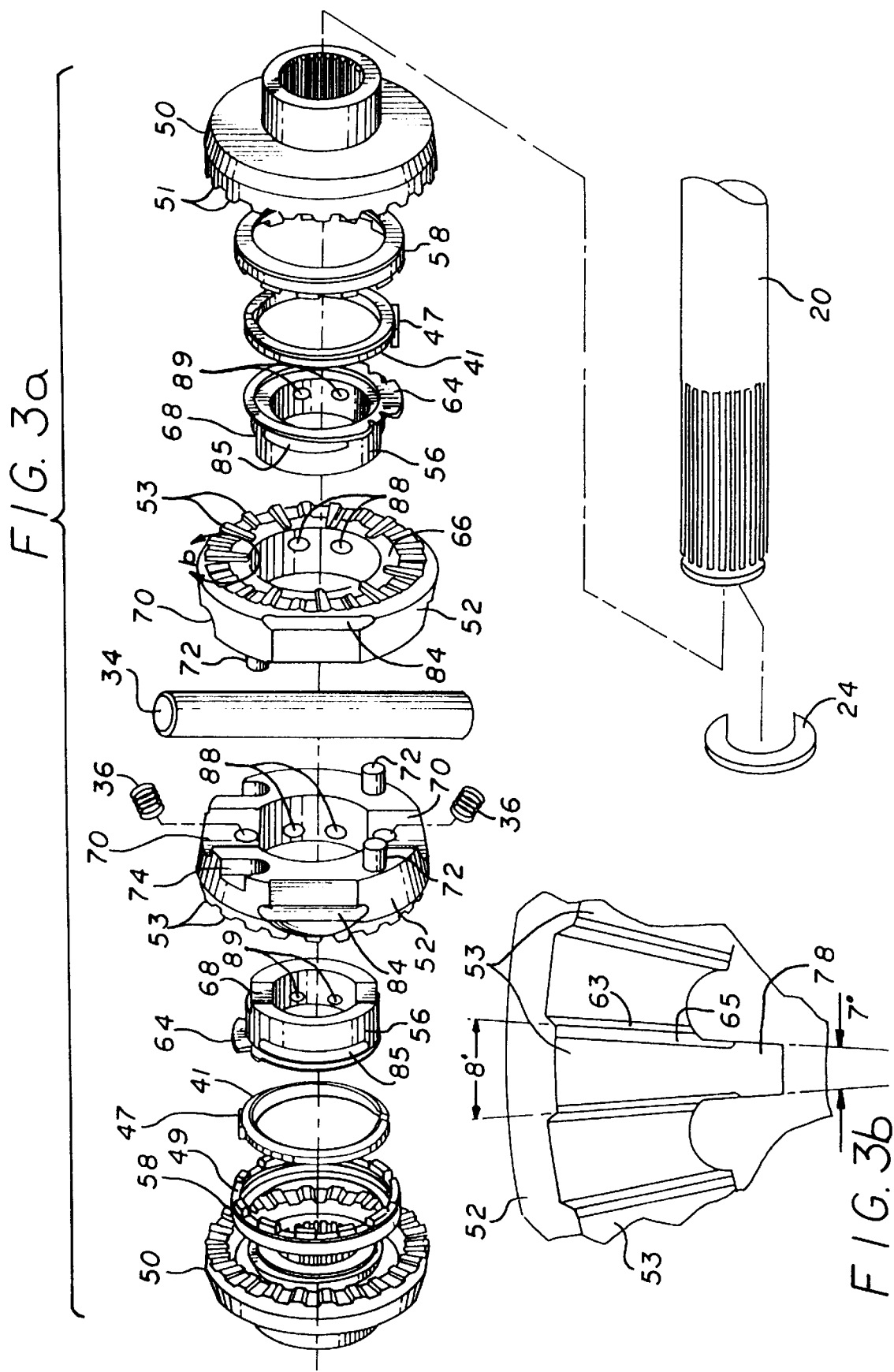
FIG. 3a is an exploded perspective view of the differential of FIG. 2 illustrating the various parts of one embodiment of the present invention.
FIG. 3b is an enlarged view of a portion of the teeth on a driver illustrating the chamfering of the teeth thereon.

Now referring to FIG. 2, a differential incorporating the present invention may be seen. The parts of the differential of the present invention visible in this figure include couplers 50 and driver 52 fitting within differential case 54. The differential shown in FIG. 2 is shown in an exploded view in FIGS. 3a and 3b, similar to the exploded view of the prior art locking differential of FIG. 1, but further illustrating the additional parts making up the differential of the present invention.

As shown therein, in addition to couplers 50 and drivers 52, the preferred embodiment of the present invention includes spacers 56, and synchro rings 58. Synchro rings 58 (ring-like structures) each fit within a relief 60 in the face of the respective coupler 50. As may be seen in FIGS. 3a and 4, each relief 60 of this embodiment has a cylindrical outer diameter within which the synchro ring 58 slides, with the inner surface 43 of the relief being angled or tapered to form a conical section. In one embodiment (not shown), each synchro ring is a split ring-like structure of a cooperative cross section and diameter to allow elastically changing its diameter for assembly purposes, with the synchro ring elastically closing so as to elastically frictionally grip the conical tapered inner surface 43 to provide the desired rotational drag with respect thereto, and to encourage the synchro ring into sliding frictional engagement with the back wall of the relief 60 for positive longitudinal location thereof. In this embodiment, the tolerance for the radial position of projections on the periphery of the synchro ring is increased because the assembled diameter of the synchro ring is dependent on the diameter of the conical tapered inner surface 43.

Figure 4:
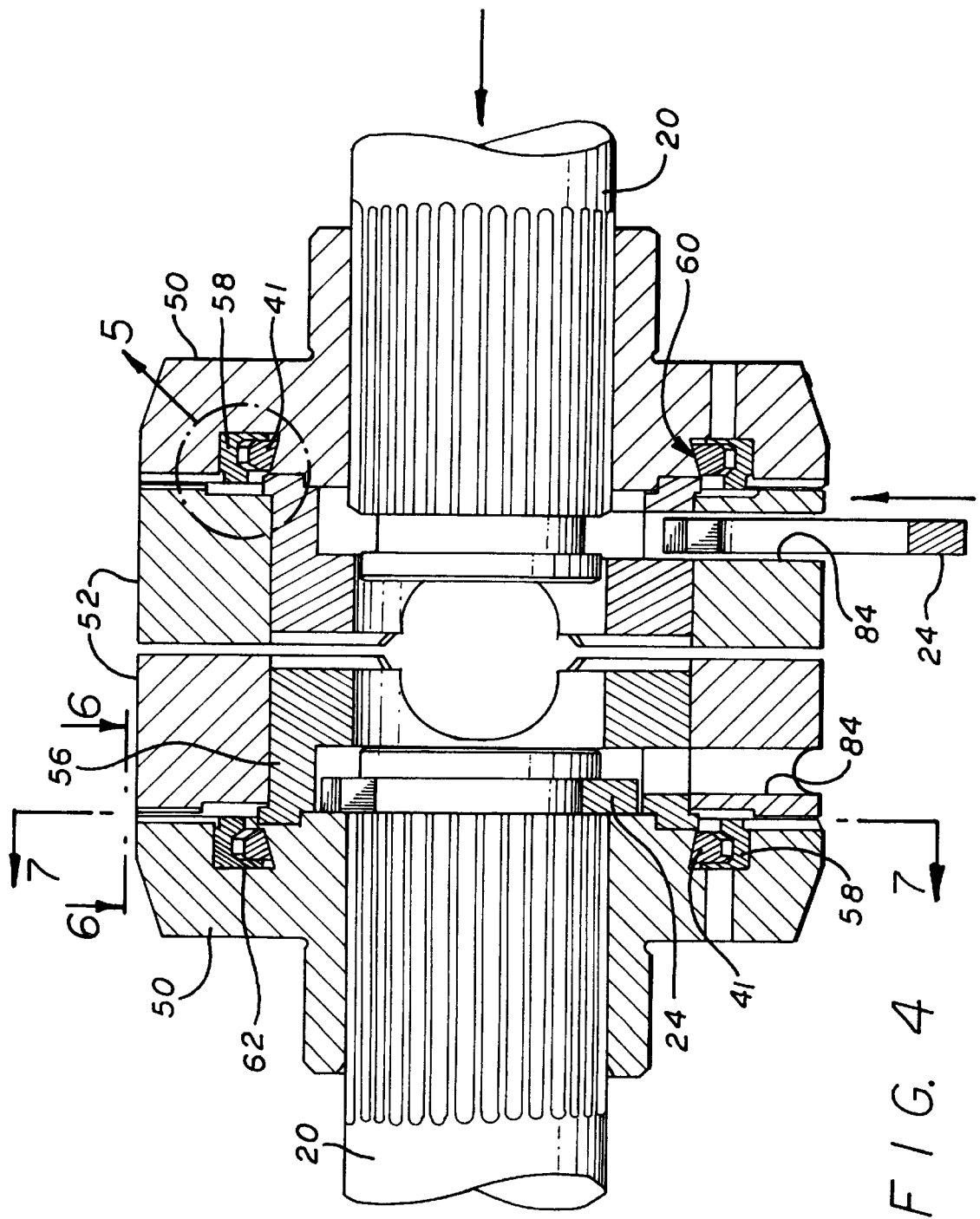
FIG. 4 is a partial cross section of the positive acting differential of FIG. 2.

In the preferred embodiment, shown in FIGS. 3a, 4, and more particularly in FIGS. 5a through 5f, each synchro ring 58 is a solid piece that closely fits against the back and the outer diameter of the relief 60. A retaining member holds the synchro ring 58 in the relief 60 so that the synchro ring may be forcibly rotated within the relief. The retaining member can be any form of mechanical restraint that holds the synchro ring firmly against the back of the relief.

An exemplary embodiment of a retaining member is a drag clip 41 as shown in FIGS. 3a and 5a–g. Each drag clip 41 is a split ring-like structure of a cooperative cross section and diameter to allow elastically changing its diameter for assembly purposes, with the drag clip elastically closing so as to elastically frictionally grip the conical tapered inner surface 43 to provide the desired rotational drag with respect thereto, and to encourage the respective synchro ring into sliding frictional engagement with the back wall of the respective relief 60 for positive longitudinal location thereof. Each drag clip is rotationally confined with respect to the respective synchro ring so that the two effectively rotate in unison.

Figures 5A, 5B:
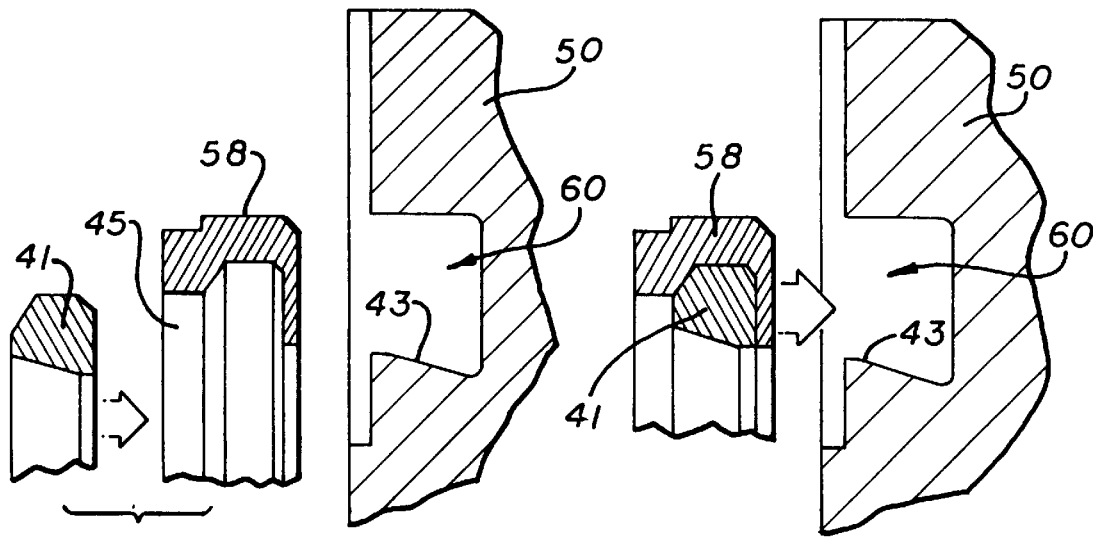
FIGS. 5a through 5g are cross sectional views of the synchro ring and drag ring taken on enlarged scale of region FIG. 4, illustrating the assembly and function of the synchro ring and drag ring.
Figures 5C, 5D:
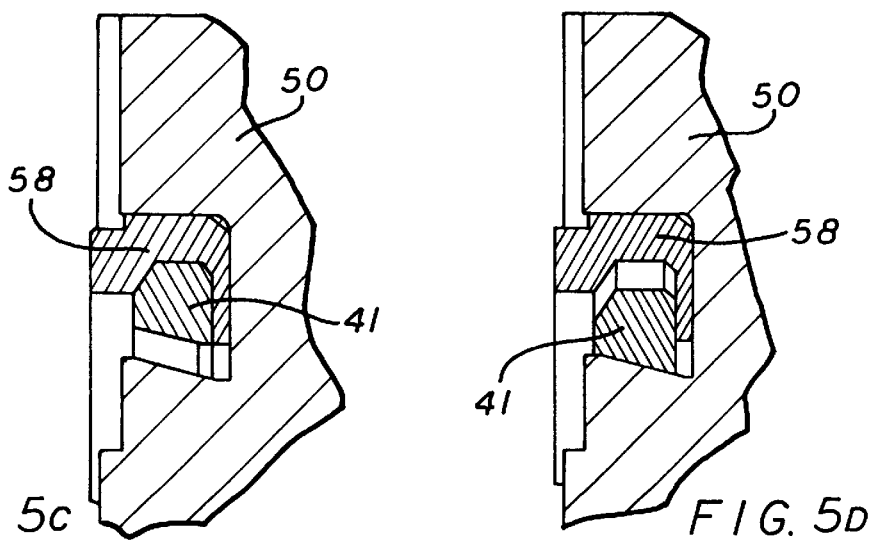

Referring now more specifically to FIGS. 5a through 5g, and more particularly starting with FIG. 5a, the exemplary embodiment uses a drag clip having an outer diameter, when undeflected, which is smaller than the diameter of the annular surface 45 of the synchro ring 58 so that the drag clip will slip into the recess in the synchro ring. Once inserted, the drag clip 41 is elastically opened to a larger diameter as shown in FIG. 5b, and the assembly of the synchro ring and drag clip is inserted into the relief 60 in the coupler, as shown in FIGS. 5b and 5c. In practice, once the leading edge of the inner diameter of the drag clip clears the leading edge of the conical tapered inner surface 43 of the relief 60, the drag clip may be released and rotated to allow the drag clip to seek the position shown in FIG. 5d.

Figure 5E:
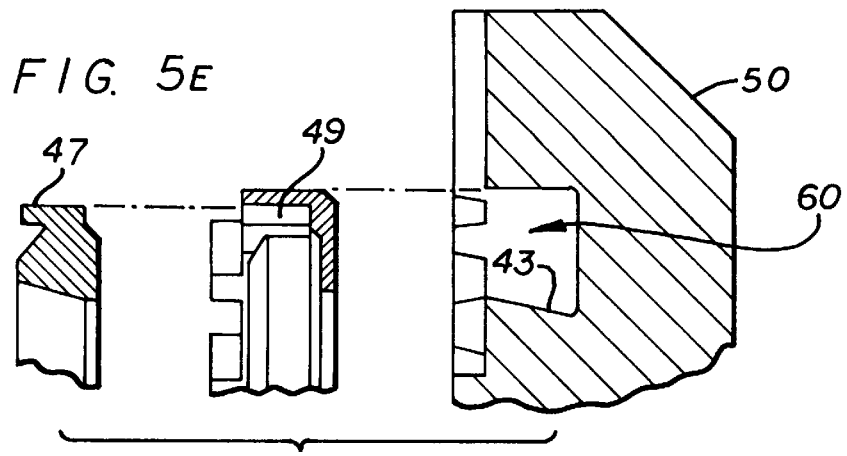
Figures 5F, 5G:
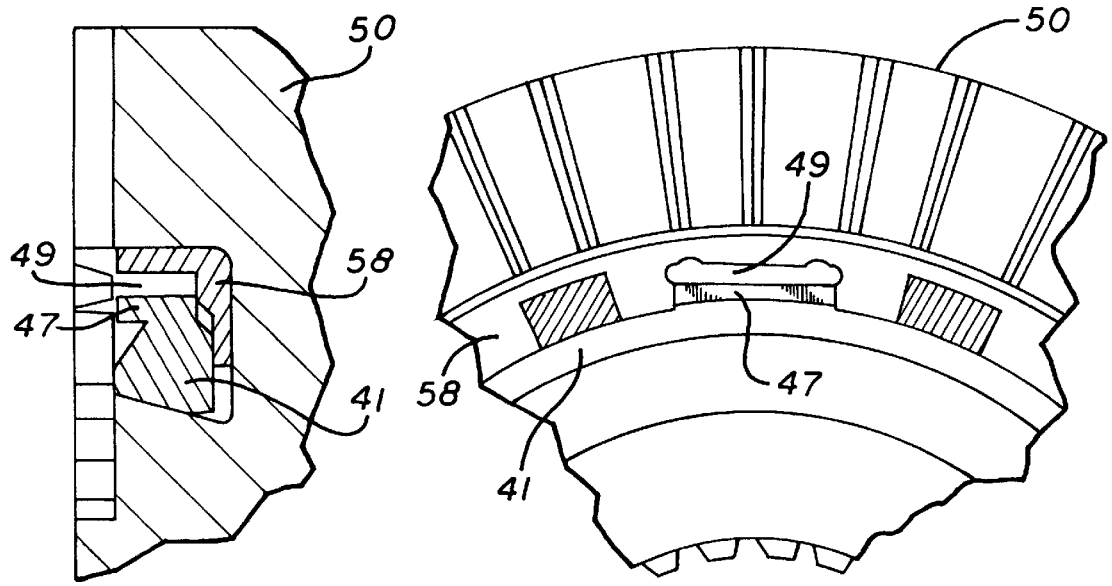

FIGS. 5e, 5f and 5g illustrate the provision to angularly confine the synchro ring 58 with respect to the drag clip 41. In particular, the cross sections of FIGS. 5e and 5f and the face view of FIG. 5g illustrate the area of the synchro ring and drag clip wherein the drag clip has a projection 47 fitting within a relief 49 in the synchro ring. There is very little circumferential clearance between the two parts, but there is sufficient radial clearance to allow relative radial motion as required for assembly purposes. The drag clip 41 causes the synchro ring 58 to rotate with the coupler 50 unless restrained, whereupon the drag clip frictionally slides on the tapered surface of the relief 60 of the respective coupler.

As may be seen in FIG. 3a, the spacers 56 each have a paddle-like projection 64 thereon, which fit into a specific location of the synchro ring 58. In the preferred embodiment, the projection 64 is received in the relief 49 that also receives the projection 47 on the drag clip 41. In the preferred embodiment described herein, the width of the paddle 64 is smaller than the relief 49 within the synchro ring 58 in such a manner as to allow a 10° total rotation of the synchro ring 58 relative to the spacer 56. Thus, within that given freedom, each synchro ring 58 will rotate in unison with the respective coupler 50, though the synchro ring will be restrained by the paddle 64 when contacting the same and will no longer rotate with the respective coupler should the coupler continue to rotate beyond that specified freedom.

Each driver 52 has a relief 66 therein for receiving the paddle 64 on the spacer 56. This relief 66 allows the spacers 56 to fit within the inner diameter of the respective drivers 52 and to be flush with the face thereof, so as to allow the parts to slide into the one-piece differential case 54 (FIG. 2). Once installed, the spacers 56 are each moved axially toward their respective couplers 50 so that the paddles 64 fit within the gap in the synchro rings 58. The spacers 56 are retained in their final position by the insertion of pin 34 which has a close fit with slots 68 in the spacers 56 in the final assembly. The slot in the spacer need not engage the entire surface of the pinion pin. As may be seen in FIG. 4, the slot may have a generally rectangular cross section, perhaps with filleted corners. The slot has a depth of less than the radius of the pinion pin and a width such that the top edges of the slot closely fit the pinion pin when the pin contacts the bottom of the slot. Therefore the pin contacts the spacer slot generally along three lines of contact. Thus, spacers 56 in the final assembly have no intentional rotational freedom about the axis of the assembly relative to pin 34, but rather in essence rotate in unison with the pin and, thus, with each other. This is to be compared with the drivers 52, which as with the prior art locking differential herein before described, have a total rotational freedom about the axis of the assembly with respect to pin 34 of approximately 5° because of the loose fit of the saddle-shaped depressions 70 on the drivers. Similarly, the drivers 52 have a relative rotation capability, one to the other, of approximately 1.5°, determined by the fit of pins 72 and slots 74 in the drivers. This is illustrated in FIGS. 14 and 15, wherein FIG. 14 illustrates the position of the pins 72 in slots 74 when the drivers are in alignment and having their saddle-shaped depressions 70 centered with respect to pin 34 of the two drivers 52, and FIG. 15 illustrates the position of the pins 72 in slots 74 when pin 34 is engaging the sides of the saddle-shaped depressions on one driver and the other driver is advanced with respect to the pinion pin 34.

Finally, as may be seen in FIGS. 7 to 13, certain teeth 78 on the face of drivers 52 extend to a diameter different than the teeth 51 (FIG. 3a) on the couplers 50, and the remaining teeth 53 on the drivers 52. Protrusions are formed by these extended teeth 78 that are intended to work with slots 76 in the synchro ring 58. (A circular pattern of protrusions could be formed separate from the teeth and be just as functional, however, perhaps not as efficient to produce as the extended teeth.) These protrusions have the same spacing as the slots 76 in the synchro rings 58 and in the embodiment presented, will fit within slots 76 with a total angular freedom between a driver 52 and a synchro ring 58 of approximately 9.6 degrees. This opening can range however, from a minimum equal to half of the saddle backlash to a maximum equal to the angle between driver teeth plus half of the saddle backlash.

Figure 7:
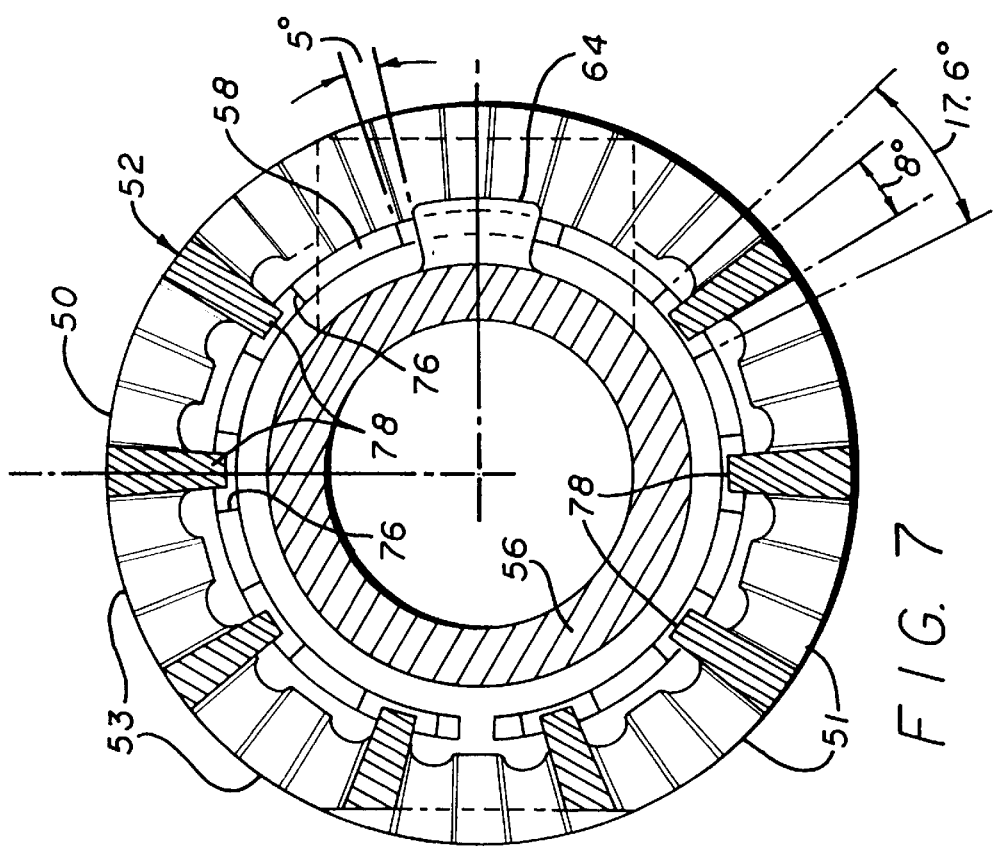
FIG. 7 is a cross section through the positive acting differential of the present invention taken along the line 7—7 of FIG. 4 and showing the parts in a symmetrical positions.

The general relationship just described may be seen in FIG. 7, which is a cross section through the positive acting differential taken along the line 7—7 of FIG. 4, though with only the cross section of the extended teeth of the driver, not all teeth of the driver, being shown so as to make the coupler teeth thereunder viewable in the figure. This allows the relative positions of the driver and the associated coupler to be easily viewed, though a true cross section would show all teeth of the driver in cross section, tending to obscure the relative position of the associated coupler thereunder. This illustrative license is continued in FIGS. 8 through 13 for the same ease of visualization purposes.

FIG. 7 illustrates the fitting of the paddle 64 in the gap of the synchro ring 58, as well as the fitting of the protrusions formed by the extended teeth 78 of the drivers 52 into the slots 76 in the synchro rings 58. In FIG. 7, all parts are angularly centered with respect to each other, the paddle 64 being centered in the gap in the synchro ring 58, the extended teeth 78 being centered in the slots in the synchro ring 58, and, since the spacer 56 is rotationally locked with respect to pin 34 (FIG. 3a), the drivers 52 are necessarily positioned with their saddle-shaped depressions 70 centered with respect to pin 34.

As with the prior art, when the pin 34 engages the saddle-shaped depressions 70 on either driver, the force of the contact, by design of the saddles, will be angled outward from the plane of the respective driver. The preferred embodiment in which the present invention is used includes a departure from the prior art related to the design of the saddle by including the displacement of the synchro ring. Previous saddle designs use pin and slot geometry that centers the disconnecting driver saddle on the pinion pin and generate a helical surface running from a cutter depth equal to the radius of the pin out beyond the top surface of the driver. The depth of the saddle is held equal to the pin radius and the thickness of the driver is such that when the driver is disconnected, the inner surface of the driver does not pass the centerline of the pin. These features facilitate manufacturing, but do not optimize backlash.

The present embodiment uses saddle geometry that optimizes backlash while creating conditions for correct positioning of the synchro ring. Backlash is optimized by recognizing that the driver needs to displace an amount only slightly greater than the height of the teeth multiplied by the tangent of the maximum saddle angle. The result is much less than half the saddle travel as used in previous designs. This minimum displacement is further modified by adding an amount to achieve a desired displacement of the pin and effect removal of the overlap of the synchro ring with the protruding teeth of the driver when the vehicle changes from driving to coasting. This amount is determined by examining the free travel of the pin from contact with the near-side of the connected driver saddle to contact with the far-side of the disconnected driver saddle. This travel must be such that by virtue of the pin carrying the spacer whose paddle moves the synchro ring, the synchro ring is moved to allow the teeth of the driver and coupler to mesh when synchronized. Once meshed, the teeth can then transmit torque, both driving and coasting/braking.

The edges on the mating teeth on the drivers 52 and couplers 50 are not square. Instead, the mating teeth are inclined in the base regions 63 thereof (see FIGS. 6a and 6b) at an angle less than that of the saddle, and the outer regions of the teeth are chamfered at an angle substantially exceeding the saddle angle. (The chamfer does not extend to the extended part of the teeth (see FIG. 3b) but rather the extended part of the teeth maintains a rectangular cross section.) Consequently when the teeth on the drivers and couplers are near or in full engagement and the pin 34 is forcibly engaged with the drivers, the net outward force on the drivers keeps the teeth on the drivers from climbing the sides of the teeth on the couplers, but allows the climbing of the teeth when pin 34 is not forcibly engaged with the respective driver. However, when the teeth on the drivers and couplers are only in slight engagement on chamfered regions 65 and the pin 34 is forcibly engaging the respective driver, the net force on the respective driver is inward toward the pin 34, allowing the climbing of the teeth in spite of pin 34 being forcibly engaged with the respective driver. It can be shown that for typical dimensions used for the tooth height and driver and coupler diameters, the total rotation of a driver relative to the respective coupler from the beginning of driver teeth climbing on the coupler teeth to the point where climbing is complete and the top of the driver teeth will begin to slide over the top of the coupler teeth is approximately 0.75°.

Figures 6A, 6B:
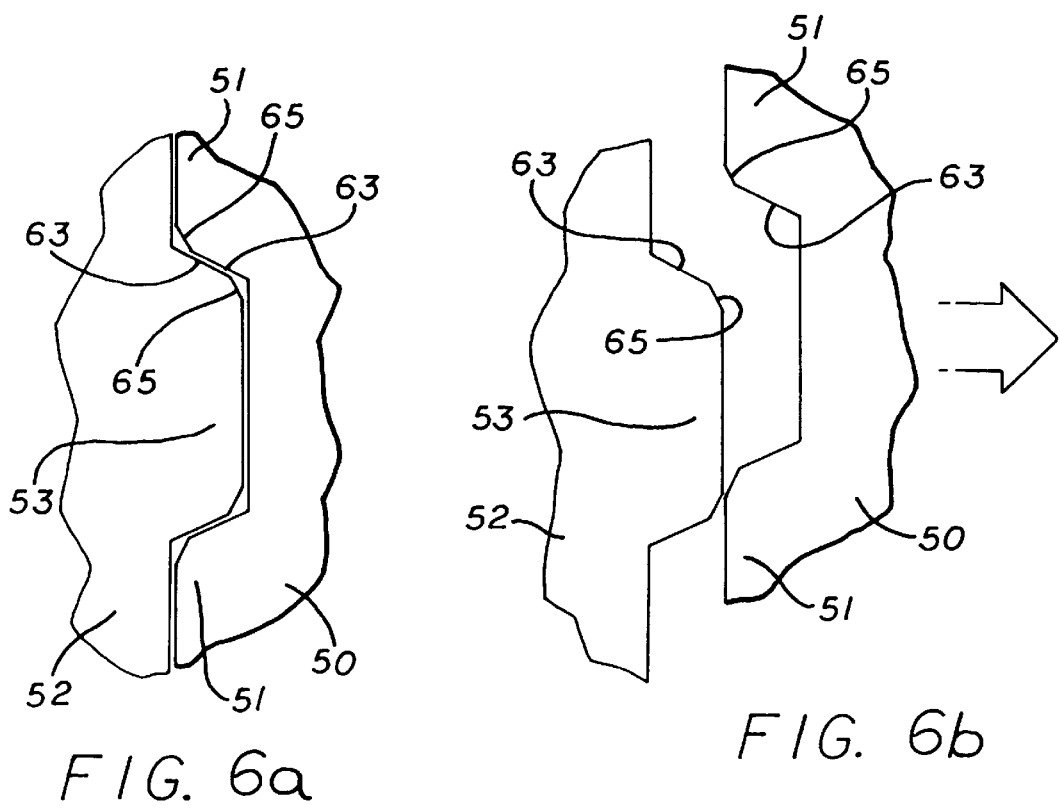
FIGS. 6a and 6b are illustrations of the chamfered tooth profile of the chamfered teeth on the drivers and the couplers when in different relative positions, as viewed along lines 6—6 of FIG. 4.
Figure 16A:
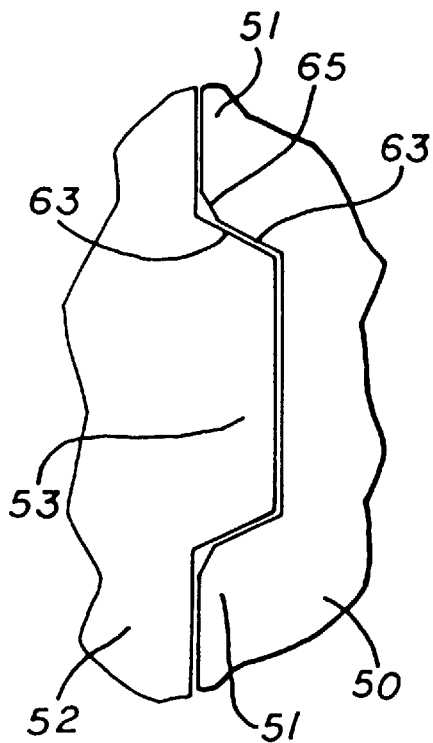
FIGS. 16a and 16b are illustrations of an alternate embodiment having the chamfered teeth on the couplers only, showing different relative positions, as viewed along lines 6—6 of FIG. 4.
Figure 16B:
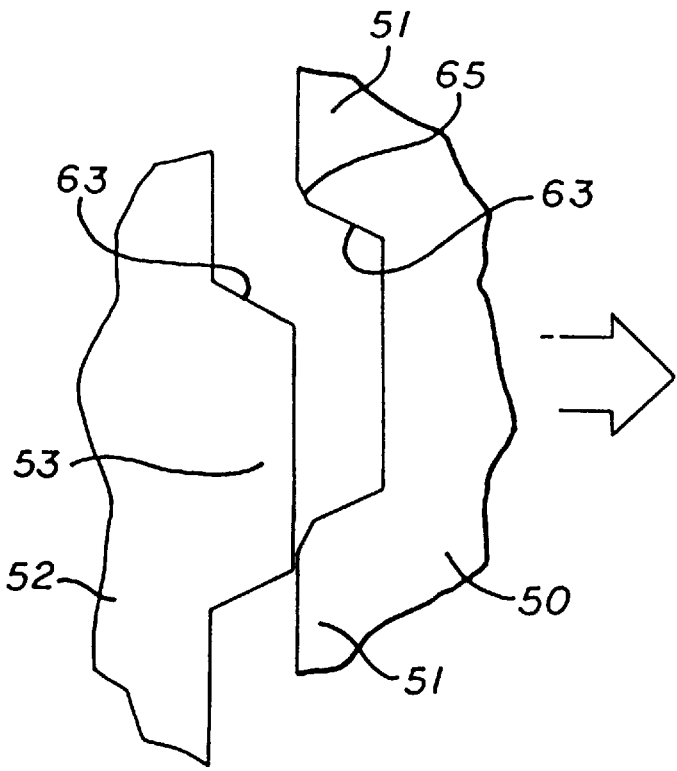

In the embodiment described above, the chamfer does not extend to the extended part of the extended teeth 78 (see FIG. 3b) but rather the extended parts of the teeth maintain a rectangular cross section (see FIG. 10a). It is possible to obtain the effects described even when the chamfer is provided on the teeth of only the drivers 52 or only the couplers 50. This is illustrated in FIGS. 16a and 16b, which correspond to FIGS. 6a and 6b, showing a chamfer only on the teeth 51 of the coupler 50. This embodiment simplifies fabrication of the driver 52 because it eliminates the requirement for a chamfer along only a portion of the extended teeth 78.

The angular motion limits and tooth angles for the embodiment described herein may be summarized as follows:

| Parts | Angular motion limits |
|---|---|
| Driver to pin 34 | 2.5° |
| Driver to driver | 1.5° |
| Paddle to pin 34 | ~0° |
| Paddle to ring | 5° |
| Ring to extended tooth on the driver | 4.8° |
| Driver to coupler tooth climbing - start to finish | ~0.75° |
| Driver and coupler tooth angle base of teeth (from line parallel to axles) | Approx 23° |
| Driver and coupler tooth angle outer region of teeth (from line parallel to axles) | Approx 65° |
| percent of tooth length in base region | Approx 80% |
| Pinion pin to driver engagement angle (from line parallel to axles) | Approx 35° |

FIG. 7 represents an arbitrary starting point for the description of the operation of the present invention. It represents a good point to start the description, as it illustrates the general symmetry of the structure and thus the similarity in the operation of the various parts while the vehicle is powering forward, powering in reverse, using the engine to retard forward motion or using the engine to retard rearward motion.

Figure 8:
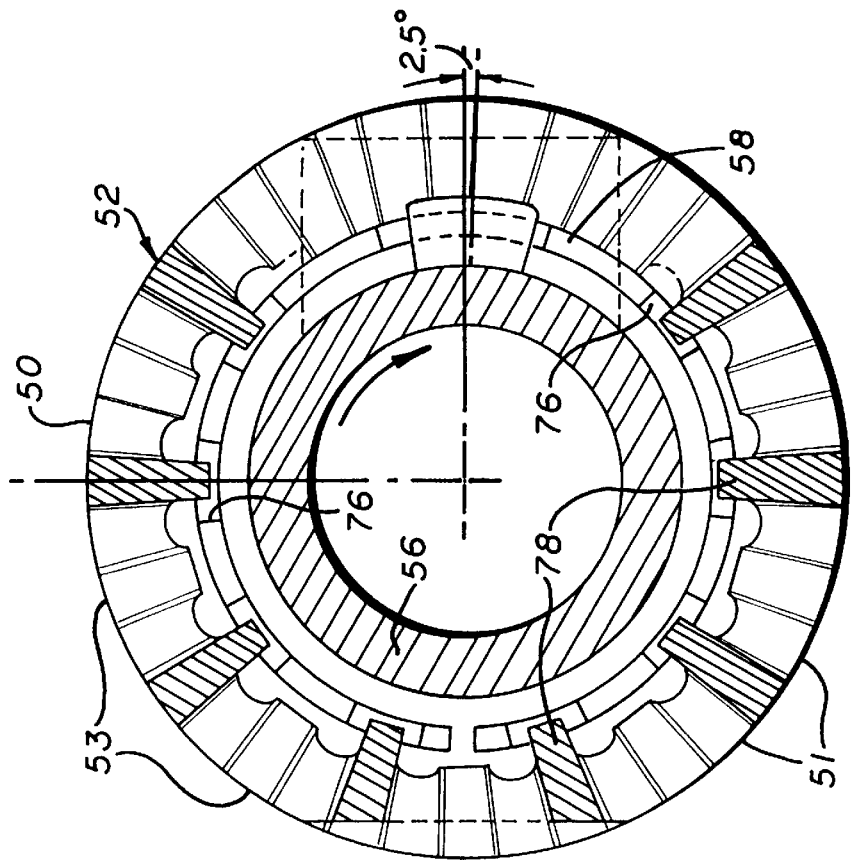
FIG. 8 is a view similar to FIG. 7, illustrating the relative part positions as the ring gear 80 (FIG. 2) begins to rotate.

Starting from the condition of FIG. 7, as the ring gear 80 (FIG. 2) begins to rotate, pin 34 (FIGS. 2 and 3) initially rotates spacer 56 and paddle 64 2.5 degrees, as shown in FIG. 8. In that regard, it is to be remembered that spacer 56 is essentially coupled to the pin 34 (FIGS. 2 and 3) so as to rotate with the pin and thus with the ring gear. Also, the frame of reference for this FIG. as well as FIGS. 8 through 13 is the driver, and accordingly, all of the foregoing FIGS. have the extended driver teeth shown in cross section in the same position, with the other parts of the assembly moving as appropriate to illustrate the relative positions of the parts during various phases of operation hereafter described.

When the spacer 56 has rotated 2.5 degrees as in FIG. 8, paddle 64 approaches one end of the opening within synchro ring 58. At the same time, the pin 34 (FIGS. 2 and 3 ) is forced against the saddle-shaped depression 70 in the driver so that no further clockwise rotation of the paddle with respect to the driver 52 may occur. Under this condition, the pin 34 pushing against the edge of the saddle-shaped depression in the driver forces the driver into engagement with the teeth of the coupler 50 to provide a positive drive for the respective axle of the vehicle.

Figure 9:
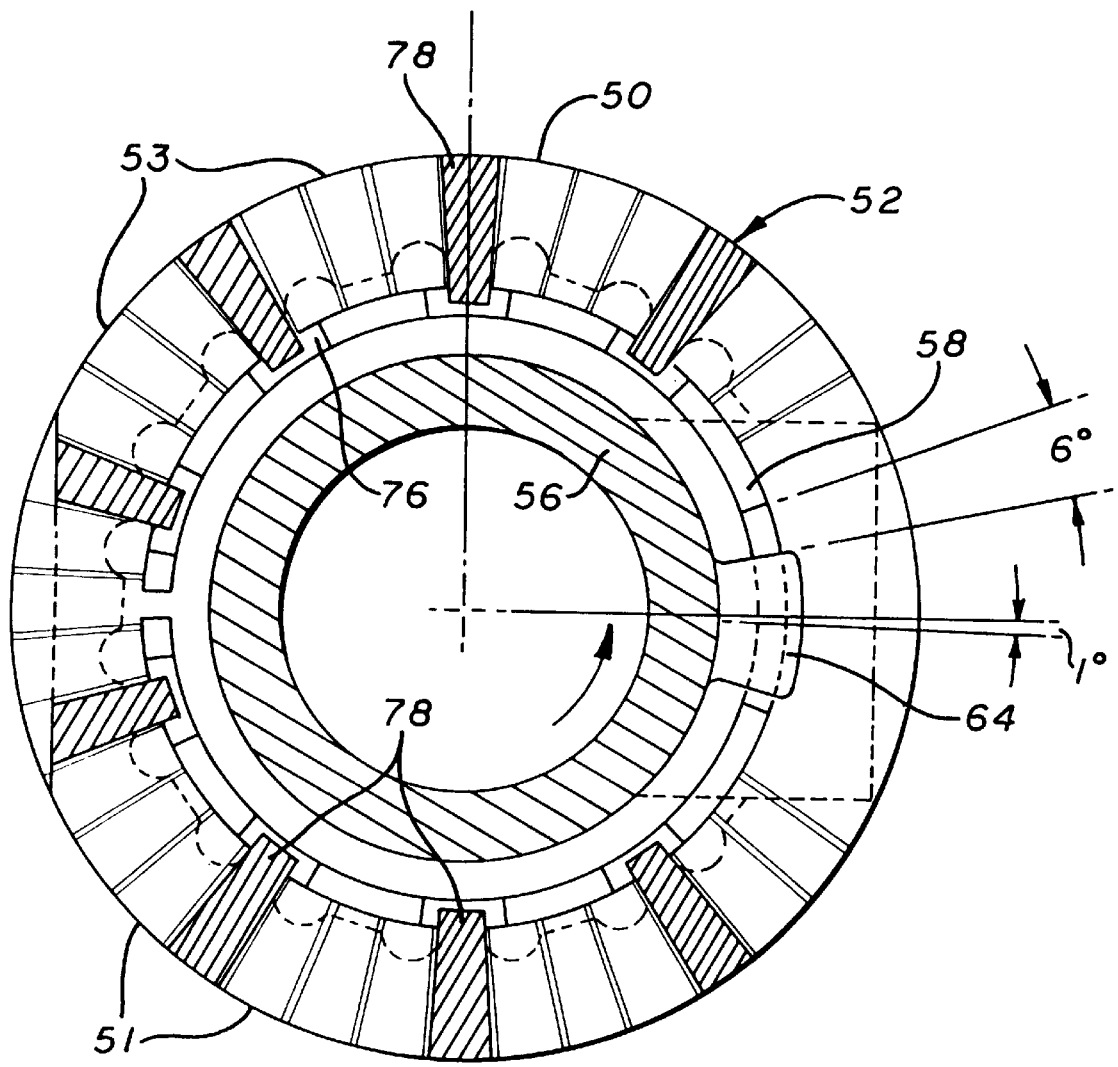
FIG. 9 is a view similar to FIG. 8, illustrating the relative part positions when the wheel for the assembly being illustrated begins to rotate slightly faster than the opposite wheel, as when the vehicle begins to be powered around a curve.

Assuming both axles of the vehicle are being driven, FIG. 9 illustrates what happens when the wheel for the assembly being illustrated begins to rotate slightly faster than the opposite wheel, as when the vehicle begins to be powered around a curve. Specifically, spacer 56 rotates to the relative position with respect to driver 52 shown in FIG. 9, the coupler 50 forcing the driver to a position advanced with respect to pin 34. However, assuming the other axle is still being driven, the driver 52 for the wheel turning faster will reach the limit of its rotational capability with respect to the opposite driver of 1.5 degrees because of the engagement of the pins 72 and the slots 74. Accordingly, as the coupler being illustrated continues to rotate faster than the coupler for the wheel still being driven, the teeth on the driver 52 begin to climb the teeth on the coupler 50, as illustrated in FIG. 6. (See also FIGS. 11a and 11b.) As the coupler rotates in the direction of the arrow shown therein, the total relative angular rotation between the coupler and driver for the driver teeth to fully climb the teeth on the coupler (FIG. 10) is on the order of 1 degree or less, in the exemplary embodiment being approximately 0.75 degrees. This brings the synchro ring 58 to within approximately 5.25 degrees of the paddle 64 and the extended teeth 78 within approximately 4.0 degrees of the edge of the slots in the synchro ring 58. This is shown in FIGS. 10a and 10b, illustrating the extended teeth 78 and the driver 52 relative to the slot in the synchro ring 58 before the climbing of the teeth on the coupler 50 begins, and again just after climbing has been completed.

Of particular importance is the relative location of the parts after such climbing has been completed. In particular, the top of the teeth on the driver 52 are now free to slide across the top of the teeth on coupler 50. Further, the top of synchro ring 58 is slightly spaced from the top of the teeth on the driver 52, something in the order of a few thousandths of an inch. Thus, while there is still a slight separation between the extended tooth 78 and the edge of a slot in synchro ring 58, the synchro ring 58 is in fact free to move to a position slightly under the top of the extended tooth 78. In the preferred embodiment this engagement is on the order of 0.020 to 0.060 inches.

Figure 11A:
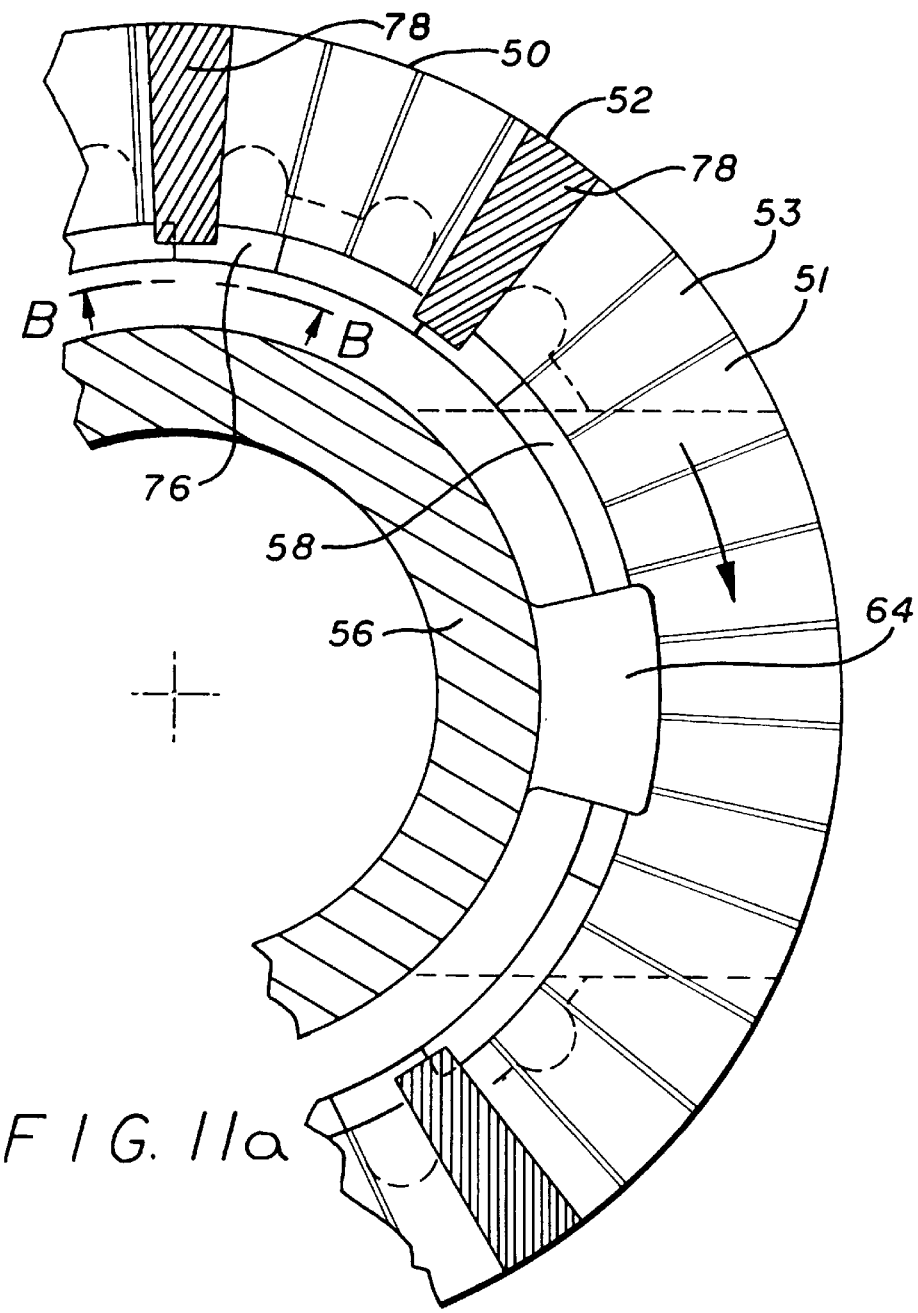
FIGS. 11a and 11b illustrate the relative part positions as the coupler being illustrated continues to rotate relative to the driver from the position shown in FIG. 10.
Figure 11B:
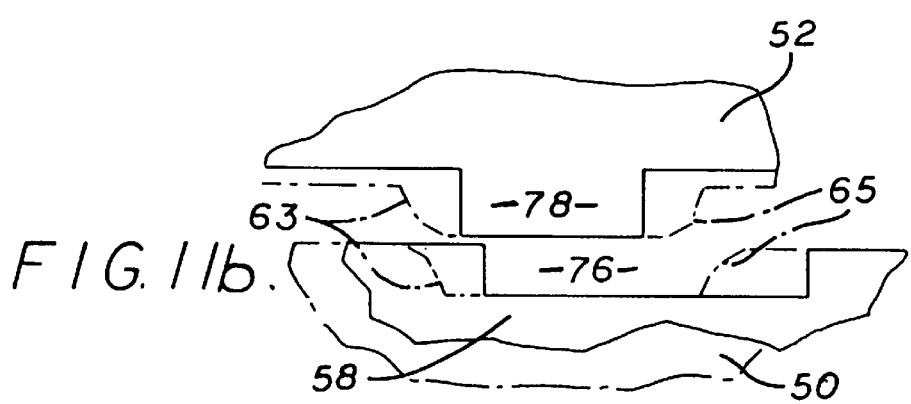

As the coupler 50 continues to rotate relative to the driver, synchro ring 58 will continue to rotate with the coupler 50 another 5.25 degrees before contacting paddle 64. This will bring synchro ring 58 under the extended teeth on driver 52, as shown in FIG. 11a, and more clearly in FIG. 11b. Because the spacer 56 is essentially locked to the pin 34 (FIG. 3) and driver 52 is limited against further motion by pins 72 and slots 74 between the two drivers (see FIG. 3), the driver 52 and the spacer 56 will remain in the position shown in FIG. 11, as will the synchro ring 58, the synchro ring slipping on the coupler as the coupler continues to rotate in the direction shown. On continued rotation of the coupler in the same direction, each time the coupler teeth come into alignment for potential engagement with the driver teeth, the synchro ring 58 will hold the extended teeth in the driver to prevent significant engagement with the coupler, more particularly only slight engagement by the chamfers on the teeth. This eliminates the noise of the repeated engaging and disengaging of the freewheeling driver and coupler experienced in the prior art. Of particular importance to achieve this is the fact that the synchro ring surface adjacent the edge of each of slots 76 therein will just barely clear the extended tooth on the driver after the teeth climbing has been completed.

Figure 12:
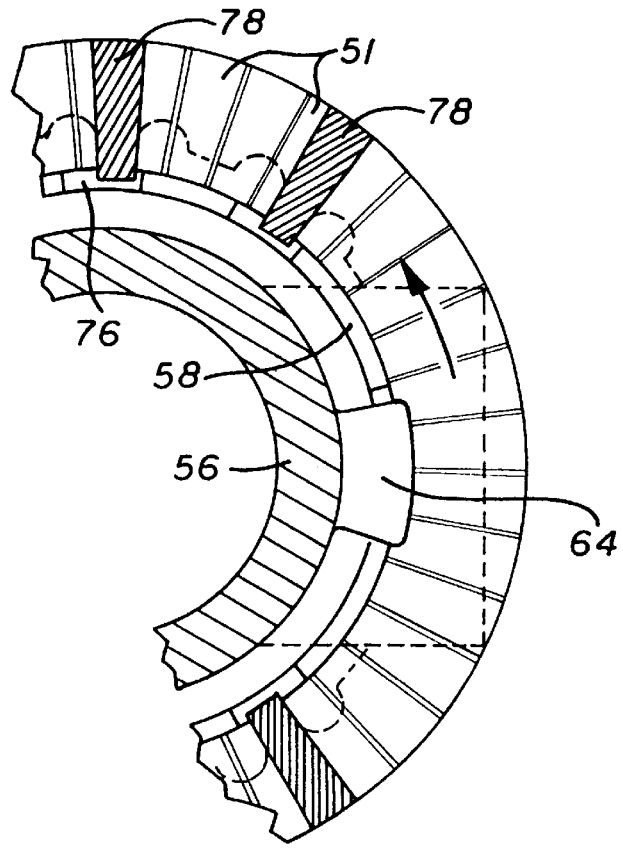
FIG. 12 illustrates the relative part positions as the coupler 50 begins to rotate in the counter-clockwise direction with respect to the driver 52.
Figure 13:
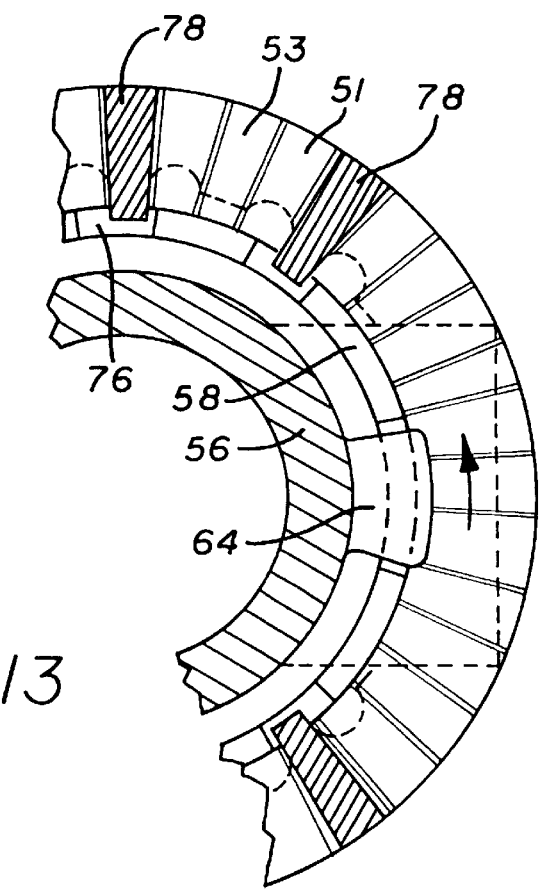
FIG. 13 illustrates the relative part positions after the teeth on the coupler and driver re-engage.

Now assume that the vehicle, still being powered, comes out of the first curve and enters a curve in the opposite direction. In this case because of the change in relative speed, the coupler 50 begins to rotate in the counterclockwise direction with respect to the driver 52, as illustrated in FIG. 12, initially taking synchro ring 58 therewith. In the first part of the rotation, the extended teeth on driver 52 will align with the slots 76 in the synchro ring 58. When, in this condition, the teeth on the coupler and driver align for engagement, the springs 36 (FIG. 3a) force the driver teeth into engagement with the coupler teeth after which time pin 34 will rotate to engage the saddle-shaped depressions 70 in driver 52 to begin driving that axle, now the more slowly rotating axle. The final position of the components of the driving wheel is illustrated in FIG. 13.

When returning to driving straight after a turn, the position of the parts relative to each other will depend upon whether, and to what extent, the driver teeth aligned with the coupler teeth for engagement. Ultimately due to variations in terrain and slight course corrections along a straight path, the previously disengaged driver will become reengaged and transfer power from the pin to coupler or vice versa. In any event, because of the general symmetry of the parts, the operation will be as described, whether powering forward or in reverse around a curve, or using the engine for braking forward motion or rearward motion while going around the curve. Also, of course, when the wheel associated with the driver and coupler which are engaged at any given time begins to slip, the opposite driver and coupler, if not already engaged, will immediately engage, thereby providing the desired torque transferring differential action.

The chamfering of the teeth on the couplers 50 or drivers 52 or both provides a number of advantageous results, whether used in prior art locking differentials or as disclosed with respect to the preferred embodiment, the quiet differential described. In particular, as described herein, the angle of the root portion of the engagable teeth on the drivers 52 and couplers 50, as seen in FIG. 6, is chosen so that when a coupler is being driven by the pinion pin 34, the tendency for the teeth 53, 78 on the driver 52 to climb the teeth 51 on the coupler 50 is more than overcome by the force along the axis of the axles between the pin 34 and the respective driver 52, forcing the driver teeth 53, 78 to remain firmly engaged with the teeth 51 on the adjacent coupler 50. The angle of the chamfers, however, has just the opposite effect, namely, if only the outer region of the teeth on a driver and associated coupler are engaged, then even if pinion pin 34 is engaging the respective driver 52 and forcing the driver teeth 53, 78 into further rotation with respect to the coupler teeth 51, the angle of the chamfers will overcome whatever axial force is provided on the driver 52 by the pinion pin 34, forcing the driver back toward the pinion pin as the chamfered portion of the driver teeth 53, 78 easily climb the chamfered portion of the coupler teeth 51, ultimately allowing the tips of the driver teeth to slide over the tips of the coupler teeth. These effects are also obtained when only the driver teeth 53, 78 or only the coupler teeth 51 are chamfered, as previously discussed.

As described, particularly with respect to FIG. 5, the synchro ring 58 and the relief 60 in the coupler have an angled or conical engaging surface to positively axially locate the synchro rings 58 with respect to the couplers. Still, with respect to the operation of the differential described, the protrusions on a synchro ring generally only move under the extended teeth on the drivers when the tops of the teeth on the drivers begin to slide over the tops of the teeth on the couplers. Because of the accumulation of tolerances, the synchro rings may allow the respective drivers to move axially a very few thousandths of an inch into reengagement with the respective coupler teeth when the teeth on the drivers and couplers begin to realign. This, however, can easily be limited to within the axial range of motion for slight chamfer engagement only, causing the coupler to continue to rotate with respect to the respective driver with little axial motion of the driver as the teeth alternately very slightly engage and slide over each other until pinion pin 34 again begins to drive the respective driver 52 in the opposite direction, forcing the teeth on the driver into firm driving engagement with the teeth on the coupler when the same realign, as previously described. Thus, in the quiet positive acting differential described, the chamfered teeth not only further quiet the operation, but also prevent the inadvertent driving engagement of the mere tips of the teeth on the drivers and the couplers, thereby eliminating the possible over stressing of the teeth tips and the associated wear and deterioration, and noise associated therewith.

Thus in both the differential described herein and prior art locking differentials such as that illustrated in FIG. 1, the chamfered teeth provide the desirable effect of avoiding any possible driving engagement of tooth tips only, which could otherwise overstress the tooth tip area of both the drivers and couplers, resulting in accelerated wear or even local failure of the teeth tips. Such partial driving engagement of the teeth, followed by the teeth becoming disengaged as the drive force is increased, provides a shock to the entire drive train, and a most distracting noise to the vehicle driver. The chamfers, however, substantially eliminate this effect and assure that the teeth engage, for driving purposes at least, only on the lower portion of the teeth, where the teeth are thicker and have no unsupported adjacent outer edge.

It should be noted that the drivers 52 have slots 84 in the flattened side surfaces thereof, as may be seen in FIGS. 2, 3a, and 4, for insertion of the C clips 24 during the assembly of the differential. This is to be compared with the recessed area 86 on the face of the drivers 30 of the prior art locking differential of FIG. 1 which were provided for this purpose. The recessed areas 86 in the prior art locking differential of FIG. 1 interrupt the continuity of the distribution of the teeth on the drivers, creating a lack of symmetry therein. The forces carried by the teeth on one side of the driver must be balanced by forces in the reduced number of teeth on the opposite side. Consequently, the load on the teeth of the drivers and couplers is not equally distributed among the teeth. This also creates a cocking force between the drivers and respective couplers which, particularly for partial teeth engagement, results in the plane of the drivers and couplers not remaining accurately parallel. Further, for any two engaging teeth, the load on the area of engagement of the teeth is not equally distributed over the engaging area. The net result of the asymmetry is faster tooth wear than necessary, and reduced resistance to abuse because of load concentrations. In the present invention, however, the symmetry in the engaging teeth eliminates any asymmetrical engagement forces and, in fact, itself provides aligning forces helping to maintain the drivers and respective couplers in alignment. The net result is a stronger assembly exhibiting reduced wear over the prior art design.

In the specific embodiment shown in FIG. 3a, one or both of the spacers 56 have slots 85 therein cooperatively disposed with respect to the slot or slots 84 in the drivers 52 to accommodate the insertion of the axle retaining clip during assembly as described. This however is not a specific requirement of this design, as other spacer designs may be used if desired. By way of but one example, a two piece spacer may be used, the spacer parts slid axially as required for insertion of the axle retaining clip. Similarly, the chamfered teeth may be advantageously used with prior art couplers and drivers as shown in FIG. 1 without slots in either the drivers or spacers as shown.

There has been disclosed and described herein new and unique positive acting differentials which, like their predecessors, may be assembled into a differential case without removal of the case from the differential housing, and which provide all of the desired features of a locking differential while at the same time alleviating a distracting sound and adverse cycling characteristic associated with the prior art differentials discussed. While the invention has been disclosed and described with respect to certain preferred embodiments thereof, it will be understood by those skilled in the art that various changes in form and detail may be made therein without departing from the spirit and scope of the invention.

What is claimed:

1. A positive acting differential comprising:

first and second coaxial couplers for engaging first and second axles coaxial with the couplers, respectively;

a pinion pin between the couplers and having its axis substantially perpendicular to the axis of the couplers;

first and second drivers coaxial with and between the first coupler and the pinion pin, and the second coupler and the pinion pin, respectively;

the first and second couplers and the first and second drivers having cooperatively disposed axially engagable teeth, the teeth having a base region and an outer region;

the first and second drivers each partially surrounding the pinion pin and being moveable along the axis of the axles between a first position wherein the teeth on one of the drivers and the adjacent coupler engage, and, unless restricted by engagement with the pinion pin, a second position wherein the teeth on one of the drivers and the adjacent coupler may slide over each other, the teeth on the couplers and the drivers being inclined in both the base region and the outer region so that the driver teeth will climb the coupler teeth unless driver motion along the driver axis is restricted by driver engagement with the pinion pin;

the drivers being restrained in relative motion about their axis to an angle which is less than the angle of relative angular freedom between either driver and the pinion pin; and, the pinion pin, when driven in rotation about the axis of the drivers and couplers, engaging one or both drivers at a pinion pin to driver engagement angle or angles sufficient to overcome the tendency of the teeth on the respective driver to climb the teeth on the respective coupler when the base regions thereof are engaged, and insufficient to overcome the tendency of the teeth on the respective driver to climb the teeth on the respective coupler when the outer regions thereof are engaged.

2. The positive acting differential of claim 1 wherein the pinion pin to driver engagement angle is approximately 35 degrees.

3. The positive acting differential of claim 1 wherein the driver and coupler tooth angle in the base region of the teeth is approximately 23 degrees.

4. The positive acting differential of claim 3 wherein one of the driver tooth angle and the coupler tooth angle in the outer region of the tooth is approximately 65 degrees.

5. The positive acting differential of claim 4 wherein the base region of each of the engagable teeth has a length that is approximately 80% of the overall tooth length.

6. The positive acting differential of claim 5 wherein the positive acting differential is assembled through an opening in a differential case.

7. A positive acting differential comprising:

first and second coaxial couplers for engaging first and second axles coaxial with the couplers, respectively;

a pinion pin between the couplers and having its axis substantially perpendicular to the axis of the couplers;

first and second drivers coaxial with and between the first coupler and the pinion pin, and the second coupler and the pinion pin, respectively;

the first and second couplers and the first and second drivers having cooperatively disposed axially engagable teeth, the teeth having a base region and an outer region;

the first and second drivers each partially surrounding the pinion pin and being moveable along the axis of the axles between a first position wherein the teeth on one of the drivers and the adjacent coupler engage, and, unless restricted by engagement with the pinion pin, a second position wherein the teeth on one of the drivers and the adjacent coupler may slide over each other, the teeth on the couplers and the drivers being inclined in both the base region and the outer region so that the driver teeth will climb the coupler teeth unless driver motion along the driver axis is restricted by driver engagement with the pinion pin;

the drivers being restrained in relative motion about their axis to an angle which is less than the angle of relative angular freedom between either driver and the pinion pin;

the pinion pin, when driven in rotation about the axis of the drivers and couplers, engaging one or both drivers at a pinion pin to driver engagement angle or angles sufficient to overcome the tendency of the teeth on the respective driver to climb the teeth on the respective coupler when the base regions thereof are engaged, and insufficient to overcome the tendency of the teeth on the respective driver to climb the teeth on the respective coupler when the outer regions thereof are engaged; and, for each coupler, a first member forcibly rotatable relative to the respective coupler to first or second extreme positions relative to the pinion pin after the teeth on the respective driver have climbed the teeth on the respective coupler, the first member preventing re-engagement of the base regions of the teeth on the respective driver and coupler when in either of the first and the second extreme positions, and allowing engagement of the base regions of the teeth on the respective driver and coupler when the first member is not near either the first or the second extreme position.

8. The positive acting differential of claim 7 wherein the positive acting differential is assembled through an opening in a differential case.

9. The positive acting differential of claim 7 wherein the first member is further comprised of a synchro ring and a retaining member that holds the synchro ring in the forcibly rotatable position relative to the respective coupler.

10. The positive acting differential of claim 9 wherein the retaining member is a drag clip elastically engaging a ring groove in the respective coupler.

11. The positive acting differential of claim 9 wherein the synchro rings are concentric to the axis of the couplers and the drivers, and each synchro ring has a plurality of projections facing the respective driver, the drivers each having at least one protrusion extending to contact a respective projection on the respective synchro ring when the synchro ring is in either of the first and the second extreme positions to prevent substantial re-engagement of the teeth on the respective driver and coupler, and to not contact the respective projection on the respective synchro ring when the synchro ring is not near either the first or the second extreme position to allow re-engagement of the base regions of the teeth on the respective driver and coupler.

12. The positive acting differential of claim 11 wherein the protrusion is an extended tooth and the drivers further comprise a plurality of extended teeth to contact the plurality of respective projections on the respective synchro ring.

13. The positive acting differential of claim 12 wherein the top of the plurality of projections on each synchro ring extend to adjacent but not beyond the top of the plurality of teeth on the respective coupler, and the top of the extended teeth on each driver are substantially coplanar with the rest of the teeth on the driver.

14. The positive acting differential of claim 7 wherein each driver has a second member rotatably fitting within the driver for loosely coupling the pinion pin and the respective first member to cause the first member to rotate between the first and the second extreme positions relative to the pinion pin.

15. The positive acting differential of claim 14 wherein each second member has a slot to engage the pinion pin, said slot having a depth less the radius of the pinion pin.

16. The positive acting differential of claim 14 wherein for assembly purposes, before the pinion pin is assembled in position, the second member may be positioned relative to the respective driver so as to not extend beyond the toothed face of the respective driver.

17. A positive acting differential comprising: first and second coaxial axles; and, within a differential case, first and second couplers coaxial with and engaging the first and second axles, respectively;

a pinion pin between the couplers, supported by the differential case and having its axis substantially perpendicular to the axis of the axles;

first and second drivers coaxial with the axles and between the first coupler and the pinion pin, and the second coupler and the pinion pin, respectively, the first and second couplers and the first and second drivers having cooperatively disposed axially engagable teeth, the teeth having a base region and an outer region;

the first and second drivers each partially surrounding the pinion pin and being moveable along the axis of the axles between a first position wherein the teeth on one of the drivers and the adjacent coupler engage, and, unless restricted by engagement with the pinion pin, a second position wherein the teeth on one of the drivers and the adjacent coupler may slide over each other, the teeth on the couplers and the drivers being inclined in both the base region and the outer region so that the driver teeth will climb the coupler teeth unless driver motion along the driver axis is restricted by driver engagement with the pinion pin;

the drivers being restrained in relative motion about their axis to an angle which is less than the angle of relative angular freedom between either driver and the pinion pin;

the pinion pin, when driven in rotation about the axis of the drivers and couplers, engaging one or both drivers at a pinion pin to driver engagement angle or angles sufficient to overcome the tendency of the teeth on the respective driver to climb the teeth on the respective coupler when the base regions thereof are engaged, and insufficient to overcome the tendency of the teeth on the respective driver to climb the teeth on the respective coupler when the outer regions thereof are engaged; and, for each coupler, a first member forcibly rotatable relative to the respective coupler to first or second extreme positions relative to the pinion pin after the teeth on the respective driver have climbed the teeth on the respective coupler, the first member preventing re-engagement of the base regions of the teeth on the respective driver and coupler when in either of the first and the second extreme positions, and allowing engagement of the base regions of the teeth on the respective driver and coupler when the first member is not near either the first or the second extreme position.

18. The positive acting differential of claim 17 wherein the differential case is a one piece differential case and the positive acting differential is assembled within the differential case through an opening in the differential case.

19. The positive acting differential of claim 17 wherein the first member is further comprised of a synchro ring and a retaining member that holds the synchro ring in the forcibly rotatable position relative to the respective coupler.

20. The positive acting differential of claim 19 wherein the retaining member is a drag clip elastically engaging a ring groove in the respective coupler.

21. The positive acting differential of claim 19 wherein the synchro rings are concentric to the axis of the couplers and the drivers, and each synchro ring has a plurality of projections facing the respective driver, the drivers each having at least one protrusion extending to contact a respective projection on the respective synchro ring when the synchro ring is in either of the first and the second extreme positions to prevent substantial re-engagement of the teeth on the respective driver and coupler, and to not contact the respective projection on the respective synchro ring when the synchro ring is not near either the first or the second extreme position to allow re-engagement of the base regions of the teeth on the respective driver and coupler.

22. The positive acting differential of claim 21 wherein the protrusion is an extended tooth and the drivers further comprise a plurality of extended teeth to contact the plurality of respective projections on the respective synchro ring.

23. The positive acting differential of claim 22 wherein the top of the plurality of projections on each synchro ring extend to adjacent but not beyond the top of the plurality of teeth on the respective coupler, and the top of the extended teeth on each driver are substantially coplanar with the rest of the teeth on the driver.

24. The positive acting differential of claim 17 wherein each driver has a second member rotatably fitting within the driver for loosely coupling the pinion pin and the respective first member to allow the first member to rotate between the first and the second extreme positions relative to the pinion pin.

25. The positive acting differential of claim 24 wherein each second member has a slot to engage the pinion pin, said slot having a depth less the radius of the pinion pin.

26. The positive acting differential of claim 24 wherein for assembly purposes, before the pinion pin is assembled in position, the second member may be positioned relative to the respective driver so as to not extend beyond the toothed face of the respective driver.

27. The positive acting differential of claim 17 wherein the drivers are restrained in relative motion about their axis to an angle slightly greater than (i) that required to allow one of the drivers to move along the axis of the axles to the second position wherein the teeth on a respective driver and the respective coupler may slide over each other when the pinion pin is still engaging the other driver, and (ii) that required to rotate the first member relative to the respective coupler to either the first or the second extreme positions when the pinion pin is still engaging the other driver.

* * * * *